United States Patent
Marushita et al.

(10) Patent No.: US 7,868,577 B2
(45) Date of Patent: Jan. 11, 2011

(54) ELECTRIC MOTOR CONTROL APPARATUS

(75) Inventors: Yoshihiro Marushita, Tokyo (JP); Hidetoshi Ikeda, Tokyo (JP); Koki Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 405 days.

(21) Appl. No.: 11/912,515

(22) PCT Filed: May 29, 2006

(86) PCT No.: PCT/JP2006/310683

§ 371 (c)(1),
(2), (4) Date: Oct. 25, 2007

(87) PCT Pub. No.: WO2006/129612

PCT Pub. Date: Dec. 7, 2006

(65) Prior Publication Data

US 2009/0058346 A1    Mar. 5, 2009

(30) Foreign Application Priority Data

May 31, 2005    (JP) .............................. 2005-158475

(51) Int. Cl.
*G05B 11/00* (2006.01)
*B25J 13/00* (2006.01)
(52) U.S. Cl. .................. 318/609; 318/611; 318/629
(58) Field of Classification Search .............. 318/560, 318/609–611, 615–619, 621, 623, 626, 629, 318/632
See application file for complete search history.

(56) References Cited

U.S. PATENT DOCUMENTS

| 5,204,602 | A | * | 4/1993 | Iwashita | 318/630 |
| 5,272,423 | A | * | 12/1993 | Kim | 318/560 |
| 7,030,585 | B2 | * | 4/2006 | Iwashita et al. | 318/567 |
| 2003/0102427 | A1 | * | 6/2003 | Tohyama et al. | 250/234 |

FOREIGN PATENT DOCUMENTS

| JP | 62-84309 A | 4/1987 |
| JP | 1-136582 A | 5/1989 |
| JP | 2-82303 A | 3/1990 |
| JP | 5-303427 A | 11/1993 |
| JP | 6-91482 A | 4/1994 |
| JP | 7-281758 A | 10/1995 |
| JP | 2002-21544 A | 7/2002 |

* cited by examiner

*Primary Examiner*—Benstu Ro
(74) *Attorney, Agent, or Firm*—Leydig, Voit & Mayer, Ltd.

(57) ABSTRACT

In order to simultaneously realize an improvement in disturbance suppression force of an electric motor control apparatus and vibration suppression of a load machine, a velocity control circuit receives a velocity command signal as a target value of velocity of an electric motor and a corrected velocity signal, obtained by correcting a velocity signal with a velocity correction signal, and outputs a torque command signal specifying target torque of the electric motor driving the load machine. A vibration suppression circuit outputs a velocity correction signal, based on an acceleration signal, indicating acceleration of the load machine. A transfer function from the acceleration signal to the torque command signal is obtained by multiplying a transfer function from a position signal, indicating position of the electric motor to the torque command signal, by a proportion characteristic having a specified gain and integration characteristic.

16 Claims, 10 Drawing Sheets

ELECTRIC MOTOR CONTROL APPARATUS

TECHNICAL FIELD

The present invention relates to an electric motor control apparatus to control an electric motor for driving a load machine such as a table of a machine tool or an arm of an industrial robot.

BACKGROUND ART

As this kind of electric motor control apparatus, there is known one in which control is performed by a torque command signal generated based on a velocity signal or a position signal of an electric motor so that the torque of the electric motor coincides with the torque command signal, and a load machine connected to the electric motor through a torque transmission mechanism is driven. However, there has been a problem that because of low rigidity of the torque transmission mechanism to couple the electric motor and the load machine, it is difficult to simultaneously realize an improvement in disturbance suppression force and vibration of the load machine.

Then, a conventional electric motor control apparatus is constructed such that a signal obtained by multiplying an acceleration signal of a load machine by a proportional characteristics is subtracted from a torque command signal generated based on a velocity signal and a position signal of an electric motor, and the vibration of the load machine included in the acceleration signal of the load machine is reflected in the torque command signal so that the vibration of the load machine is suppressed (see, for example, patent document 1).

Alternatively, a structure is made such that a vibration suppression circuit is added which inputs an acceleration signal of a load machine and corrects a torque command signal outputted by a position control circuit, an electric motor, the load machine, the position control circuit and the vibration suppression circuit are represented by a model of a state equation, and gains of the position control circuit and the vibration suppression circuit are determined so as to minimize an evaluation function including terms in which a position deviation, acceleration of the load machine and operation energy to be given to the motor are taken into consideration and state variables of the state equation, so that responsibility for the command is improved without vibrating the load machine (see, for example, patent document 2).

Patent document 1: JP-A-6-91482

Patent document 2: JP-A-5-303427

DISCLOSURE OF THE INVENTION

Problems that the Invention is to Solve

According to the invention disclosed in the patent document 1, when a velocity proportional gain $K_{vp}$ is fixed to a certain value, the vibration of the load machine can be suppressed by increasing an acceleration feedback gain $K_a$. However, since the magnitude of $K_a$ suitable for the vibration suppression varies according to the velocity proportional gain $K_{vp}$, each time the velocity proportional gain $K_{vp}$ is adjusted in order to improve the disturbance suppression force, it is necessary to readjust the acceleration feedback gain $K_a$, and there has been a problem that the adjustment operation becomes troublesome.

Besides, although it is necessary to increase the acceleration feedback gain $K_a$ in order to suppress the vibration of the load machine, since the structure is such that the signal obtained by proportionally multiplying the acceleration signal of the load machine is added to the torque command signal outputted by the velocity control circuit, the effect of the acceleration feedback gain $K_a$ for the purpose of vibration suppression and the effect of the velocity integral gain $K_{vi}$ and the position proportional gain $K_p$ for the purpose of disturbance suppression interfere with each other to cause vibration, and there has been a problem that sufficient vibration suppression effect and disturbance suppression effect can not be obtained at the same time.

Besides, according to the invention disclosed in the patent document 2, the accurate mathematical model relating to the machine system including the electric motor and the load machine is required, and for that purpose, special means for identifying the frequency characteristic of the mechanical system and the like are required, and there has been a problem that the structure of the whole apparatus becomes large and complicated.

Besides, although it is necessary to set the weight of the evaluation function in order to determine the gains of the position control circuit and the vibration suppression circuit, since the relation between the weight of the evaluation function and the obtained result is unclear, adjustment by trial and error must be performed in order to obtain a satisfactory result, and the adjustment operation becomes complicated, and further, Riccati equation must be solved in order to determine the gains of the position control circuit and the vibration suppression circuit, and accordingly, there has been a problem that the adjustment operation becomes complicated.

The present invention has been made to solve the above problems, and it is an object to provide an electric motor control apparatus in which an improvement of disturbance suppression force and vibration suppression of a load machine can be simultaneously realized by a simple gain adjustment.

Means for Solving the Problems

An electric motor control apparatus is constructed such that position control means inputs a position command signal to specify a target value of a position of an electric motor to drive a load machine and a position signal to indicate a value of the position of the electric motor, and outputs a velocity command signal to specify a target value of a velocity of the electric motor, and velocity control means inputs the velocity command signal outputted by the position control means and a correction velocity signal obtained by adding a velocity signal to indicate a value of the velocity of the electric motor and a velocity correction signal to correct the velocity signal, and outputs a torque command signal to specify a target value of a torque of the electric motor to drive the load machine, and further, vibration control means that inputs an acceleration signal to indicate an acceleration of the load machine or an acceleration of the load machine on which a low-pass filter and a high-pass filter are made to act, outputs the velocity correction signal, and the vibration control means is set a transfer function from the acceleration signal to the torque command signal to be a transfer function obtained by multiplying a transfer function from the position signal to the torque command signal by a proportion characteristic and an integration characteristic.

EFFECTS OF THE INVENTION

There are not required special means for performing calculation to obtain information relating to the mechanical system including the electric motor and the load machine and for identifying a frequency characteristic, and independently of adjustment of a velocity proportional gain and a velocity integral gain to suppress disturbance in the velocity control of the electric motor and the load machine, when a feedback gain of the acceleration signal of the load machine is set to a fixed value, the vibration suppression of the load machine can be realized, and therefore, the improvement of disturbance suppression force in the velocity control of the electric motor and the load machine and the vibration suppression of the load machine can be simultaneously realized by a simple gain adjustment.

BEST MODE FOR CARRYING OUT THE INVENTION

Figure 1:
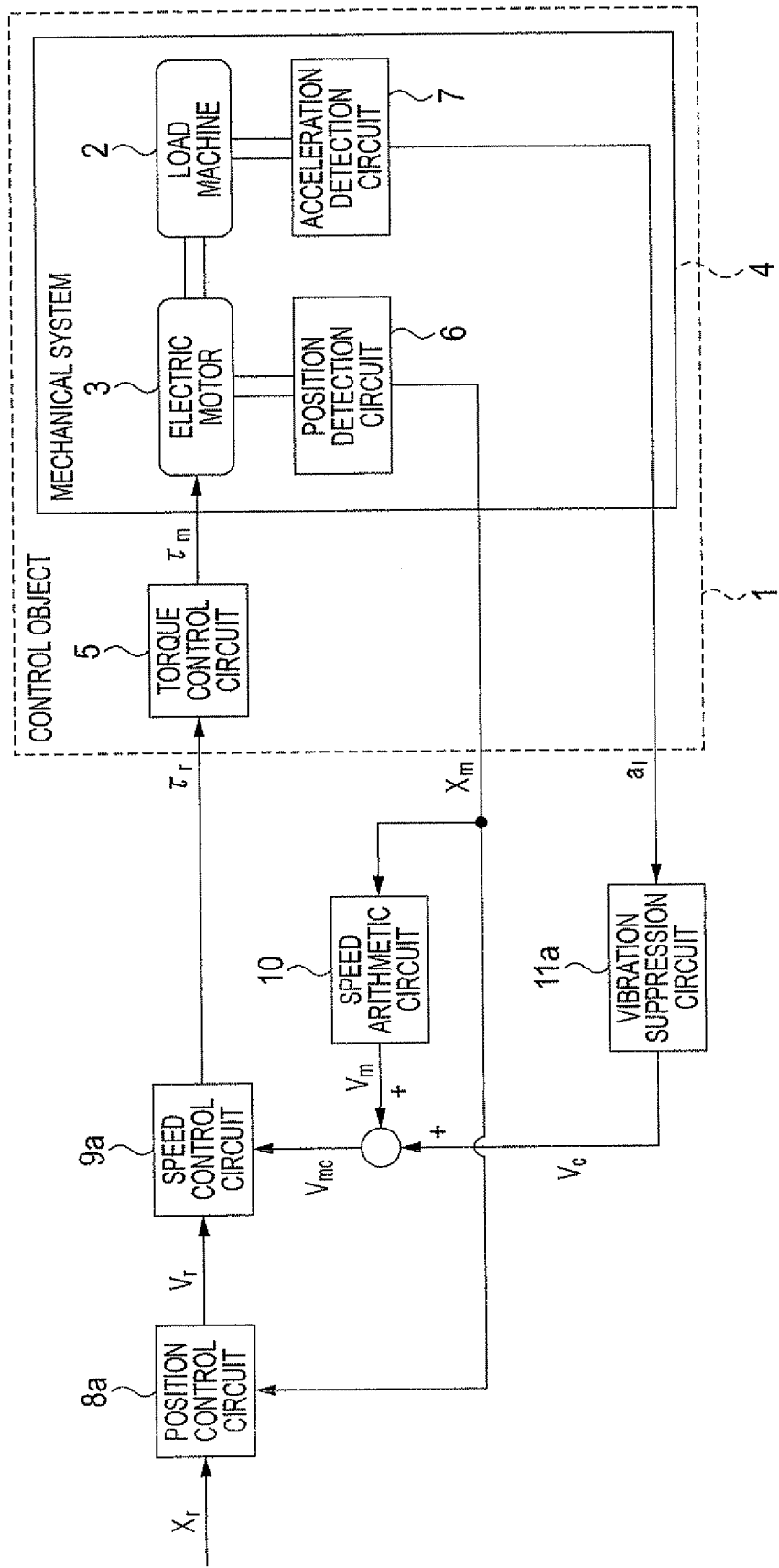
FIG. 1 is a block diagram showing an example of an electric motor control apparatus according to embodiment 1 of the invention.

FIG. 1 is a block diagram showing an electric motor control apparatus of embodiment 1 of the invention. A control object 1 includes a mechanical system 4 including an electric motor 3 to drive a load machine 2, and a torque control circuit 5 to control torque $\tau_m$ of the electric motor 3 to drive the load machine 2 so that it coincides with a torque command signal $\tau_r$. Besides, the mechanical system 4 includes, in addition to the load machine 2 and the electric motor 3, a position detection circuit 6 to detect a position signal $x_m$ as a present value of a position of the electric motor 3, and an acceleration detection circuit 7 to detect an acceleration signal $a_l$ as a present value of an acceleration of the load machine 2.

A position control circuit 8a inputs a position command signal $x_r$ as a target value of the position of the electric motor 3 and the position signal $x_m$, and outputs a velocity command signal $v_r$ as a target value of a velocity of the electric motor 3.

A velocity control circuit 9a inputs the velocity command signal $v_r$ outputted by the position control circuit 8a and a corrected velocity signal $v_{mc}$ obtained by adding a velocity signal $v_m$ outputted by a velocity calculate circuit 10 performing an calculate operation on the position signal $x_m$ and a velocity correction signal $v_c$ to correct the velocity signal $v_m$, and outputs the torque command signal $\tau_r$ as the target value of the torque $\tau_m$ of the electric motor 3 to drive the load machine 2.

The velocity correction signal $v_c$ is outputted by a vibration suppression circuit 11a which inputs the acceleration signal $a_l$ of the load machine 2, and a transfer function of the vibration suppression circuit 11a is determined such that a transfer function from the acceleration signal $a_l$ to the torque command signal $\tau_r$ becomes one obtained by multiplying a transfer function from the position signal $x_m$ to the torque command signal $\tau_r$ by a proportion characteristic of a specified gain and an integration characteristic.

Figure 2:
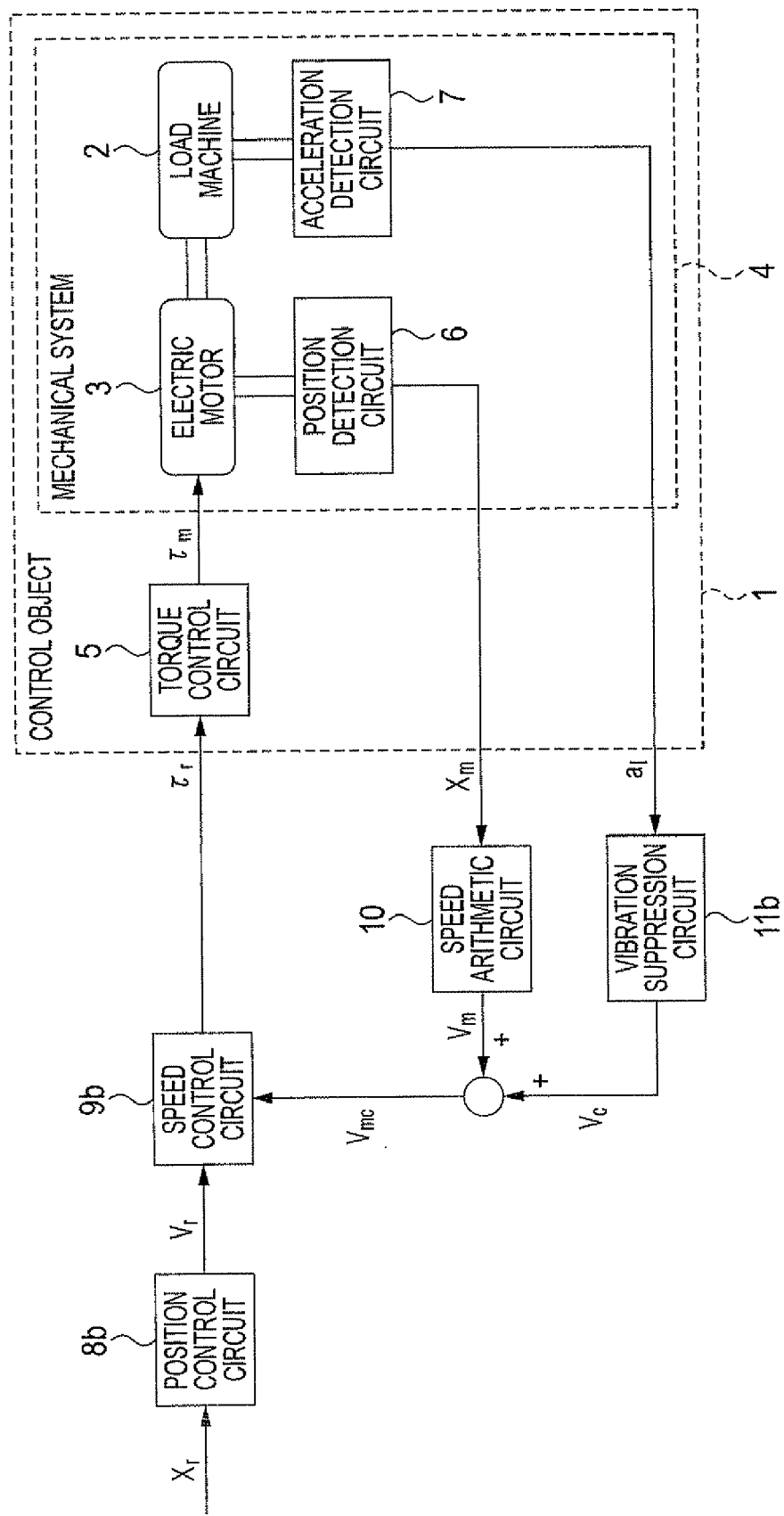
FIG. 2 is a block diagram showing an example of the electric motor control apparatus according to the embodiment 1 of the invention.

The principle of the embodiment 1 will be described by use of a structure of FIG. 2 which is simple as compared with the structure of FIG. 1 and in which the feedback of the position signal $x_m$ is not inputted to a position control circuit 8b. In FIG. 2, a control object 1 is the same as that of FIG. 1.

The position control circuit 8b inputs a position command signal $x_r$ and outputs a velocity command signal $v_r$.

A velocity control circuit 9b inputs the velocity command signal $v_r$ outputted by the position control circuit 8b and a corrected velocity signal $v_{mc}$ obtained by adding a velocity signal $v_m$ and a velocity correction signal $v_c$ to correct the velocity signal $V_m$, and outputs a torque command signal $\tau_r$, where the velocity signal $v_m$ is output of a velocity calculate circuit 10 and calculated from the position signal $x_m$.

A velocity correction signal $v_c$ is generated by proportionally multiplying an acceleration signal $a_l$ of a load machine 2 in a vibration suppression circuit 11b.

Incidentally, in the structure of FIG. 2, the position control circuit 8b is not always a component of the electric motor control apparatus, and there is conceivable a structure in which the velocity command signal $v_r$ is an input from the outside of the electric motor control apparatus.

Next, the principle of the embodiment 1 will be described.

It is assumed that the mechanical system 4 is a two-inertia system which has a mechanical resonant characteristic and in which a transfer function from the torque command signal $\tau_r$ to the velocity signal $v_m$ of the electric motor 3 has only one mechanical resonant characteristic. At this time, when a transfer function from the torque $\tau_m$ of the electric motor 3 to the velocity signal $v_m$ of the electric motor 3 is $G_v(s)$, and a transfer function from the torque $\tau_m$ of the electric motor 3 to the acceleration signal $a_l$ of the load machine 2 is $G_a(s)$, $G_v(s)$ and $G_a(s)$ are respectively represented as follows.

$$G_v(s) = \frac{\omega_z^{-2} s^2 + 1}{Js(\omega_p^{-2} s^2 + 1)} \qquad (1)$$

$$G_a(s) = \frac{1}{j(\omega_p^{-2} s^2 + 1)} \qquad (2)$$

where $\omega_z$ denotes an antiresonant frequency, $\omega_p$ denotes a resonant frequency, and J denotes the total inertia of the mechanical system 4, and when the inertia of the electric motor 3 is $J_m$ and the inertia of the load machine 2 is $J_l$, the total inertial J is represented by the sum of $J_m$ and $J_l$. $G_v(s)$ has a pair of complex zeros on the imaginary axis, and when the complex zero is made z', z' is given by a following expression.

$$z' = \pm j\omega_z \quad (3)$$

Besides, the velocity control circuit 9b is constructed so that a transfer characteristic from the corrected velocity signal $v_{mc}$ to the torque command signal $\tau_r$ becomes a transfer characteristic of PI control represented by a following expression.

$$C_v(s) = \frac{k_v(s + \omega_{vi})}{s} \quad (4)$$

where $k_v$ denotes a velocity proportional gain, and $\omega_{vi}$ denotes a velocity integral gain.

First, a gain by which the acceleration signal $a_l$ of the load machine 2 is proportionally multiplied in the vibration suppression circuit 11b is made α, and consideration is given to the electric motor control apparatus in which this gain α is 0, that is, the velocity correction signal $v_c$ is not added to the velocity signal $v_m$ of the electric motor 3. When the transfer characteristic of the torque control circuit 5 is ideally made 1, and an open-loop transfer function at the time when the loop is opened at the input end of the control object 1 is made $L_v'(s)$, $L_v'(s)$ becomes the transfer function of the loop starting from the input end of the control object 1, passing through the position detection circuit 6 to detect the position signal $x_m$ of the electric motor 3, the velocity calculate circuit 10 and the velocity control circuit 9b, and returning to the input end of the control object 1, and is represented by a following expression.

$$L_v'(s) = C_v(s)G_v(s) = -\frac{k_v(s + \omega_{vi})(\omega_z^{-2}s^2 + 1)}{Js^2\omega_p^{-2}s^2 + 1} \quad (5)$$

From expression (5), zeros of $L_v'(s)$ become a real zero $-\omega_{vi}$ and a pair of complex zeros $\pm j\omega_z$ on the imaginary axis, and the real zero $-\omega_{vi}$ given by the velocity control circuit 9b and the complex zero z' of $G_v(s)$ appear as they are.

on the other hand, when consideration is given to the case of α>0, when an open-loop transfer function at the time when the loop is opened at the input end of the control object 1 is made $L_v(s)$, $L_v(s)$ is the sum of a transfer function of a loop starting from the input end of the control object 1, passing through the electric motor 3, the position detection circuit 6, the velocity calculate circuit 10 and the velocity control circuit 9b, and returning to the input end of the control object 1, and a transfer function of a loop starting from the input end of the control object 1, passing through the load machine 2, the acceleration detection circuit 7, the vibration suppression circuit 11b and the velocity control circuit 9b, and returning to the input end of the control object 1, and is represented by a following expression.

$$L_v(s) = C_v(s)G_v(s) + \alpha C_v(s)G_a(s) \quad (6)$$

$$= -\frac{k_v(s + \omega_{vi})(\omega_z^{-2}s^2 + \alpha s + 1)}{Js^2(\omega_p^{-2}s^2 + 1)}$$

From expression (6), $L_v(s)$ includes a real zero $-\omega_{vi}$ and a pair of complex zeros changed by the gain α. When the complex zero of $L_v(s)$ is made z, z is given by a following expression.

$$z = -\left(\frac{\alpha\omega_z}{2}\right)\omega_z \pm j\sqrt{1 - \left(\frac{\alpha\omega_z}{2}\right)^2}\omega_z \quad (7)$$

Besides, when an damping coefficient of the complex zero z of $L_v(s)$ is made $\zeta_z$, and an angle between the complex zero z and the real axis on the complex plane is made φ, the damping coefficient $\zeta_z$ of the complex zero z is given by a following expression.

$$\zeta_z = \cos\phi = \frac{\alpha\omega_z}{2} \quad (8)$$

In general, it is necessary to increase the gain of a open-loop transfer function in order to improve the disturbance suppression effect, and it is known that when the gain of the open-loop transfer function is sufficiently increased, the pole (hereinafter referred to as the close-loop pole) of a close-loop transfer function in which the loop is not opened gradually approaches the zero of the open-loop transfer function. Accordingly, when the gain of the open-loop transfer function is increased, the damping coefficient of the close-loop pole approaches the damping coefficient of the zero (hereinafter referred to as the open-loop zero) of the open-loop transfer function of the expression (8).

The damping coefficient of the close-loop pole is a typical index to indicate the rate of damping of vibration of a close-loop response, and as the damping coefficient of the close-loop pole becomes small, the vibration of the close-loop response becomes large, and as the damping coefficient of the close-loop pole becomes large, the vibration of the close-loop response attenuates quickly.

According to the embodiment 1, when the damping coefficient $\zeta_z$ of the open-loop complex zero indicated by the expression (8) is set to a suitable large value, even if the gain of the open-loop transfer function is increased in order to improve the disturbance suppression effect, the damping coefficient of the close-loop complex pole is increased and the vibration can be suppressed. That is, the disturbance suppression and the vibration suppression can be simultaneously realized.

The above property will be described in detail with reference to FIG. 3 and FIG. 4.

Figure 3:
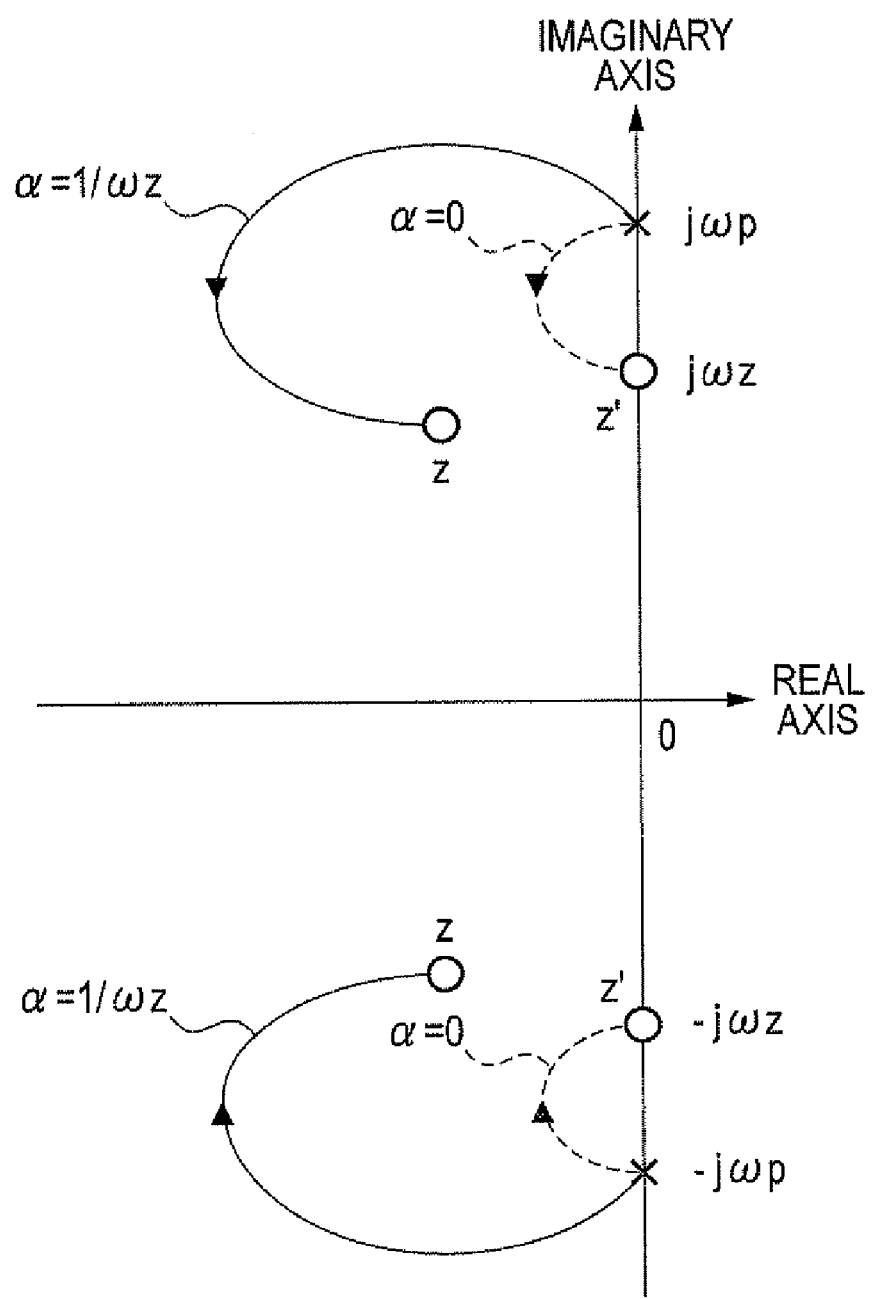
FIG. 3 is a view showing a root locus in the electric motor control apparatus according to the embodiment 1 of the invention.

FIG. 3 is a schematic view showing a root locus of a close-loop complex pole when a velocity proportional gain $K_v$ is changed. Here, for simplification of the explanation, $\omega_{vi}$ is made 0, and α is made $1/\omega_z$ so that the damping coefficient of the complex zero z becomes $\zeta_z = 0.5$.

In FIG. 3, the root locus of the close-loop complex pole at the time of α=0 is indicated by a dotted line, the root locus of the close-loop complex pole at the time of α>0 is indicated by a solid line, the open-loop zero is indicated by a ○ mark, an open-loop pole is indicated by a x mark, and an arrow of each of the root loci indicates a directions in which the close-loop pole moves when the velocity proportional gain $k_v$ is increased.

Incidentally, the close-loop pole on the real axis is located at the origin when the velocity gain is 0, and as the velocity proportional gain $k_v$ increases, it converges on the open-loop zero located at $-\infty$. This locus becomes the same locus in both cases of $\alpha=0$ and $\alpha=1/wz$ (not shown).

Figure 4:
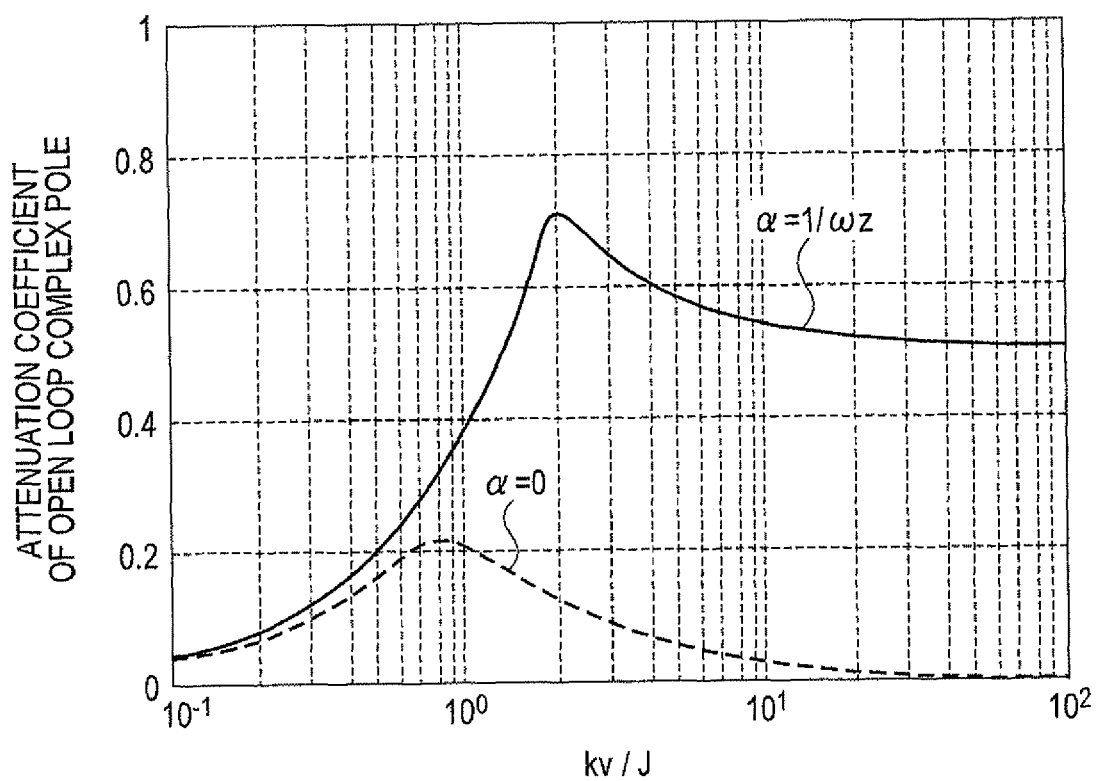
FIG. 4 is a view showing a relation between a velocity proportional gain and an damping coefficient of a close-loop complex pole in the electric motor control apparatus according to the embodiment 1 of the invention.

FIG. 4 is a view showing the change of the damping coefficient of the close-loop complex pole when the velocity proportional gain $k_v$ is increased, the horizontal axis indicates the velocity proportional gain $k_v$ normalized by the total inertia J, and the vertical axis indicates the damping coefficient of the close-loop complex pole.

When the gain $\alpha$ is 0, when the velocity proportional gain $k_v$ is increased from 0 in order to improve the disturbance suppression force, the close-loop complex pole is moved in the direction of going away from the imaginary axis, and the damping coefficient of the close-loop complex pole becomes maximum at a certain value of $k_v$.

When the velocity proportional gain $k_v$ is further increased from the value at which the damping coefficient becomes maximum, the close-loop complex pole approaches the complex zero z' of $L_v'(s)$ on the imaginary axis, and the damping coefficient of the close-loop complex pole gradually approaches 0. Although the vibration of the load machine 2 becomes large in accordance with that, since the position of the complex zero z' can not be changed even if the velocity proportional gain $k_v$ and the velocity integral gain $\omega_{vi}$ are adjusted, the velocity proportional gain $k_v$ must be decreased in order to increase the damping coefficient and to suppress the vibration of the load machine 2.

From the above, in the case where the gain $\alpha$ is 0, that is, the velocity correction signal $v_c$ is not added to the velocity $v_m$ of the electric motor 3, the improvement of the disturbance suppression force and the vibration suppression can not be simultaneously realized.

On the other hand, when the gain $\alpha$ is increased positively, the damping coefficient of the complex zero z' of $G_v(s)$ can be increased. That is, the complex zero z of $L_v(s)$ is moved to a position apart from z' on the imaginary axis, and the damping coefficient $\zeta_z$ of the complex zero z of $L_v(s)$ can be increased.

At this time, when the velocity proportional gain $k_v$ is increased in order to improve the disturbance suppression force, the close-loop complex pole is moved in the direction of going away from the imaginary axis, and the damping coefficient of the close-loop complex pole is increased. When $k_v$ is further increased, similarly to the case of $\alpha=0$, the damping coefficient of the close-loop complex pole is decreased, however, as described above, the damping coefficient $\zeta_z$ of the complex zero z of $L_v(s)$ can be made to have a suitable magnitude, even if the close-loop complex pole approaches the complex zero z of $L_v(s)$, the damping coefficient of the close-loop pole does not become 0, the adjustment can be performed so that the load machine 2 does not vibrate.

That is, the improvement of the disturbance suppression force and the vibration suppression of the load machine can be simultaneously realized.

Also in the structure of FIG. 1, the vibration suppression circuit 11a can be constructed similarly to the structure of FIG. 2, and the content is as follows.

In FIG. 1, the structure is made such that the position control circuit 8a has the transfer characteristic of a position proportional gain $k_p$, and the velocity control circuit 9a has the transfer characteristic of PI control indicated by the expression (4) similarly to FIG. 2. At this time, when attention is paid to the feedback loop from the position detection circuit 6, the transfer characteristic from the position signal $x_m$ to the torque command signal $\tau_r$ is represented by a following expression.

$$\tau_r = -\frac{k_v(s+\omega_{vi})(s+k_p)}{s} x_m \qquad (9)$$

When the structure is made such that the transfer characteristic from the acceleration signal $a_l$ to the torque command signal $\tau_r$ becomes one obtained by multiplying the transfer characteristic from the position signal $x_m$ to the torque command signal $\tau_r$ by a proportion integration characteristic of the gain $\alpha$, since the damping of the open-loop complex zero can be adjusted similarly to the structure of FIG. 2, the transfer characteristic as represented by a following expression has only to be obtained.

$$\tau_r = -\frac{k_v(s+\omega_{vi})(s+k_p)}{s} \frac{\alpha}{s} a_l \qquad (10)$$

On the other hand, the transfer characteristic from the velocity correction signal $v_c$ to the torque command signal $\tau_r$ is represented by a following expression.

$$\tau_c = -\frac{k_v(s+\omega_{vi})}{s} v_c \qquad (11)$$

Accordingly, the vibration suppression circuit 11a is constructed so as to have a transfer function $C_a(s)$ of PI control as represented by a following expression in which a proportion gain is $\alpha$ and an integral gain is $k_p$.

$$C_a(s) = \frac{\alpha(s+k_p)}{s} \qquad (12)$$

Next, the adjustment of the vibration suppression circuit 11a, the vibration suppression circuit 11b, the velocity control circuit 9a, and the velocity control circuit 9b of the embodiment 1 will be described.

The damping coefficient $\zeta_z$ can be increased by increasing the gain $\alpha$ positively, and when the damping coefficient $\zeta_z$ is about 0.5, a sufficient vibration suppression effect can be obtained when the velocity proportional gain $k_v$ is increased. Besides, even if the damping coefficient $\zeta_z$ is further increased and is made 1 or more, especially an excellent effect can not be obtained, while such a bad influence that the convergence becomes slow or robust stability becomes poor increases. Accordingly, the gain $\alpha$ is adjusted so that the damping coefficient becomes $\zeta_z$=approximately 0.5. In the description, although the antiresonant damping of the control object 1 is made 0, in the case where the antiresonant damping of the control object 1 is larger than 0, the damping coefficient $\zeta_z$ may be made a value smaller than approximately 0.5 according to the magnitude of the value.

Besides, the damping coefficient $\zeta_z$ does not depend on the velocity proportional gain $k_v$ and the velocity integral gain $\omega_{vi}$. Thus, independently of the adjustment of the velocity proportional gain $k_v$ and the velocity integral gain $v_i$, the gain $\alpha$ has only to be fixed to a certain value within the range in which the vibration of the load machine 2 can be suppressed. For example, when $\alpha$ is made approximately $1/\omega_z$ so that $\zeta_z$ becomes approximately 0.5, the vibration of the load machine 2 can be sufficiently suppressed.

Incidentally, when the antiresonant frequency $\omega_z$ of the mechanical system 4 is previously known, the gain $\alpha$ can be set so that the damping coefficient $\zeta_z$ coincides with the optimum value, however, also in the case where the antiresonant frequency $\omega_z$ is unknown, by merely increasing the gain $\alpha$ positively, the damping coefficient $\zeta_z$ is increased and the vibration suppression effect can be obtained.

Accordingly, special means for performing calculation to acquire information relating to the mechanical system 4, such as the antiresonant frequency $\omega_z$, and for identifying the frequency characteristic are unnecessary, and the vibration of the load machine 2 can be suppressed by the simple adjustment of gradually increasing $\alpha$ from 0.

Besides, since the damping coefficient $\zeta_z$ does not depend on the velocity proportional gain $k_v$, the gain $\alpha$ and the velocity proportional gain $k_v$ can be independently adjusted, and the improvement of the disturbance suppression force and the vibration suppression of the load machine 2 can be independently adjusted.

Besides, since the damping coefficient $\zeta_z$ does not depend on the velocity integral gain $\omega_{vi}$ as well, the gain $\alpha$ and the velocity integral gain $\omega_{vi}$ can also be independently adjusted. From the expression (6), it is understood that even if the velocity integral gain $\omega_{vi}$ is changed, the real zero $-\omega_{vi}$ of $L_v(s)$ merely moves on the real axis, and an influence is not exerted on the damping coefficient $\zeta_z$ of the complex zero changed by the gain $\alpha$.

Since the damping coefficient of the real zero is 1, the load machine 2 is not vibrated by the influence of the close-loop pole converging on the real zero $-\omega_{vi}$. In this kind of electric motor control apparatus, setting is often performed so that the velocity integral gain $\omega_{vi}$ is linked with the velocity proportional gain $k_v$, and $\omega_{vi}$ is also increased according to the increase of the velocity proportional gain $k_v$. However, also in that case, it is not necessary to change the setting relating to the velocity proportional gain $k_v$ and the velocity integral gain $\omega_{vi}$, and when the structure of the embodiment 1 is adopted in which the velocity control signal $v_c$ is added to the velocity signal $v_m$ of the electric motor 3, the improvement of the disturbance suppression force and the vibration suppression can be simultaneously realized by the simple adjustment of only adjusting the gain $\alpha$ as stated above.

Incidentally, the position proportional gain $k_p$ can be treated similarly to the velocity proportional gain $k_v$.

Besides, in the embodiment 1, although the structure is such that the acceleration signal $a_l$ of the load machine 2 is proportionally multiplied to generate the velocity correction signal $v_c$ in the vibration suppression circuit 11a, the structure may be made such that a signal obtained by removing a specified frequency component from the acceleration signal $a_l$ of the load machine 2 is proportionally multiplied.

For example, by adding a low-pass filter to remove a component of a specified frequency or higher to the vibration suppression circuit 11a or the vibration suppression circuit 11b, it is possible to remove a high frequency noise which is included in the acceleration signal $a_l$ of the load machine 2 and has a possibility of exerting a bad influence on the stability of the mechanical system 4. The cut-off frequency of the low-pass filter has only to be five or more times higher than the antiresonant frequency $\omega_z$ of the mechanical system 4.

Besides, by adding a high-pass filter to remove a component of a specified frequency or lower to the vibration suppression circuit 11a or the vibration suppression circuit 11b, a steady-state error due to an offset included in the acceleration signal $a_l$ of the load machine 2 can be removed. Incidentally, the cut-off frequency of the high-pass filter has only to be lower than $\frac{1}{4}$ of the antiresonant frequency $\omega_z$ of the mechanical system 4.

Since the embodiment 1 is constructed as stated above, special means for performing calculation to obtain information relating to the mechanical system 4 and for identifying the frequency characteristic are unnecessary, and independently of the adjustment of the position proportional gain $k_p$, the velocity proportional gain $k_v$, and the velocity integral gain $\omega_{vi}$, by the simple adjustment of setting the gain $\alpha$ to a fixed value so that the damping coefficient $\zeta_z$ becomes a suitable value of 1 or less, the improvement of the disturbance suppression force and the vibration suppression of the load machine 2 can be simultaneously realized.

Besides, as in the structure of FIG. 2, when there is no feedback input of the position signal $x_m$ in the position control circuit 8b, a similar effect can be obtained by the simpler structure in which the velocity correction signal $v_c$ obtained by proportionally multiplying the acceleration signal $a_l$ of the load machine 2 is added to the velocity signal $v_m$ of the electric motor 3.

Incidentally, although the description has been made on the example in which the velocity control circuit 9a and the velocity control circuit 9b have the transfer characteristic of the PI control, even in the case where the circuits have another transfer characteristic, for example, when they have the transfer characteristic of IP control, the vibration suppression circuit has only to be constructed such that a filter determined by $\omega_{vi}$ is added to PID control, and the vibration suppression circuit 11a or the vibration suppression circuit 11b can be constructed by a similar method.

EMBODIMENT 2

Figure 5:
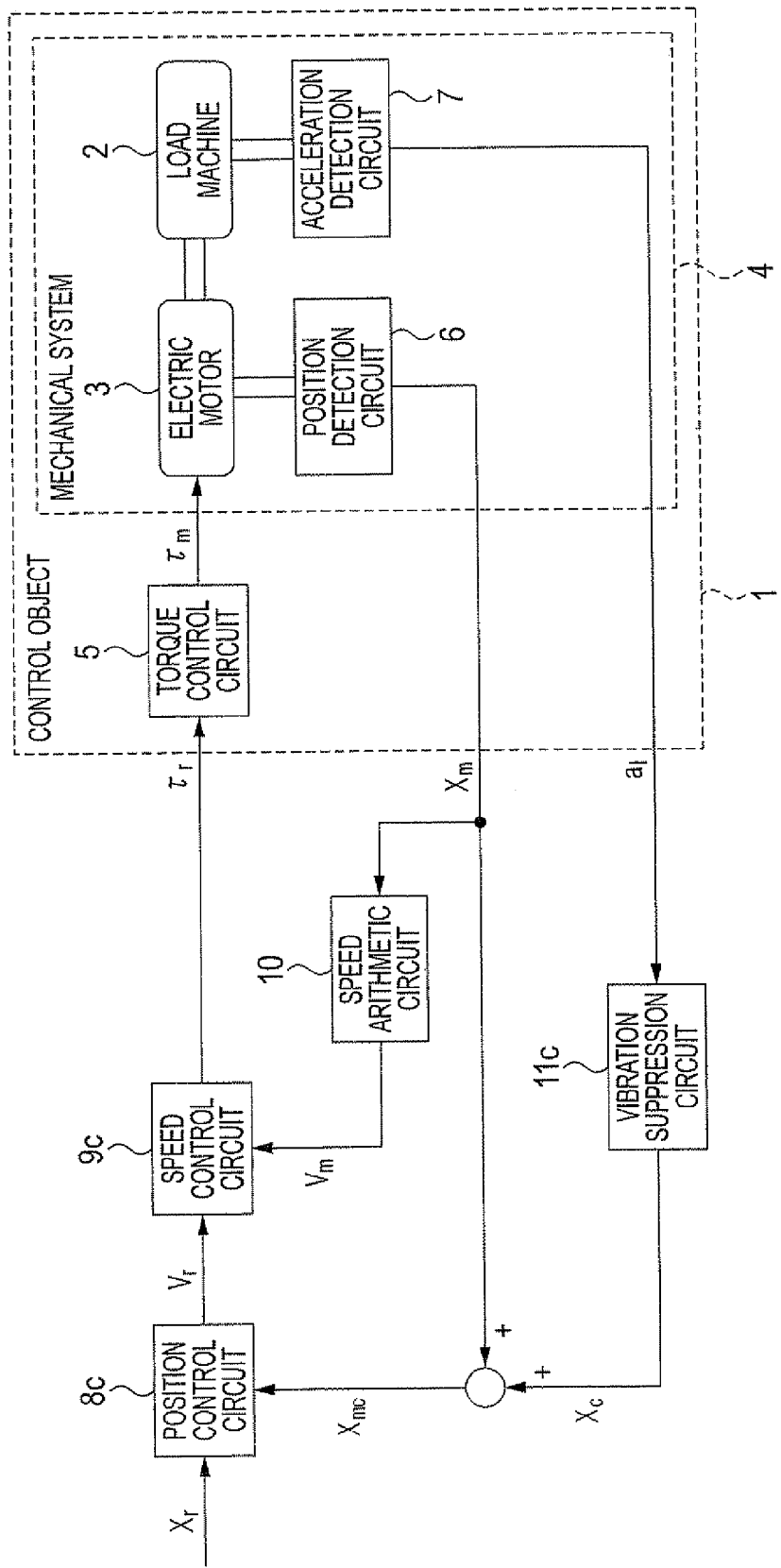
FIG. 5 is a block diagram showing an example of an electric motor control apparatus according to embodiment 2 of the invention.

FIG. 5 is a block diagram showing an electric motor control apparatus of embodiment 2.

A control object 1 is the same as that of the embodiment 1.

A position control circuit 8c inputs a position command signal $x_r$ and a corrected position signal $x_{mc}$ obtained by adding a position signal $x_m$ and a position correction signal $x_c$ to correct the position signal $x_m$, and outputs a velocity command signal $v_r$.

A velocity control circuit 9c inputs the velocity command signal $v_r$ outputted by the position control circuit 8c and a velocity signal $v_m$ outputted by the velocity calculate circuit 10 performing an calculate operation on the position signal $x_m$, and outputs a torque command signal $\tau_r$.

The position correction signal $x_c$ is outputted by the vibration suppression circuit 11c which inputs an acceleration signal $a_l$ of a load machine 2, and a transfer function of this vibration suppression circuit 11c is determined such that a transfer function from the acceleration signal $a_l$ to the torque command signal $\tau_r$ becomes one obtained by multiplying a transfer function from the position signal $x_m$ to the torque command signal $\tau_r$ by a proportion characteristic of a specified gain and an integration characteristic.

Figure 6:
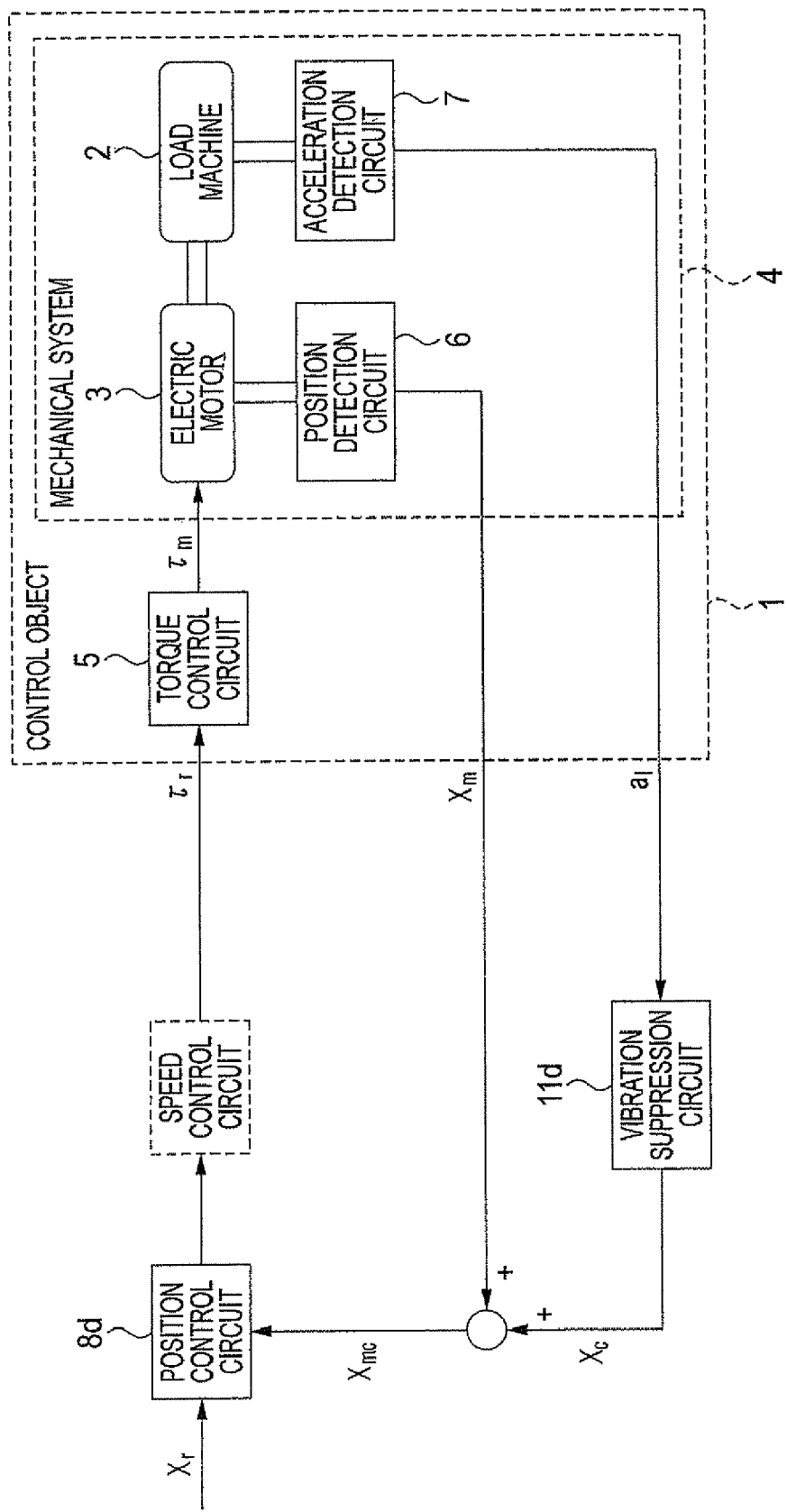
FIG. 6 is a block diagram showing an example of the electric motor control apparatus according to the embodiment 2 of the invention.

The principle of this embodiment 2 will be described by use of a structure of FIG. 6 which is simple as compared with the structure of FIG. 5 and in which the feedback of the velocity signal $v_m$ is not inputted to the velocity control circuit 9c. In FIG. 6, a control object 1 is the same as that of FIG. 5.

In the structure of FIG. 6, a position control circuit 8d is constructed to directly output a torque command signal $\tau_r$ without interposing a velocity control circuit, inputs a position command signal $x_r$ and a corrected position signal $x_{mc}$, and outputs the torque command signal $\tau_r$. Besides, a position correction signal $x_c$ is generated such that a vibration suppression circuit 11d integrates a signal obtained by proportionally multiplying an acceleration signal $a_l$ of a load machine 2.

Next, the principle of the embodiment 2 will be described. Similarly to the embodiment 1, it is assumed that a mechanical system 4 is a two-inertia system which has a mechanical resonant characteristic and in which a transfer function from the torque command signal $\tau_r$ to a position signal $x_m$ of an electric motor 3 has only one mechanical resonant characteristic. At this time, when a transfer function from a torque $\tau_m$ of the electric motor 3 to the position signal $x_c$ of the electric motor 3 is $G_p(s)$, $G_p(s)$ is represented by a following expression.

$$G_p(s) = \frac{G_v(s)}{s} = \frac{\omega_z^{-2}s^2 + 1}{Js^2(\omega_p^{-2}s^2 + 1)} \quad (13)$$

Besides, it is assumed that the vibration suppression circuit 11d proportional-integrates the acceleration signal $a_l$ of the load machine 2, and a transfer characteristic from the acceleration signal $a_l$ of the load machine 2 to the position correction signal $x_c$ is given by a following expression.

$$C_a(s) = \frac{\alpha}{s} \quad (14)$$

where α denotes an integral gain of the vibration suppression circuit 11d.

Besides, it is assumed that a transfer characteristic from the position signal $x_m$ of the electric motor 3 to the torque command signal $\tau_r$ in the position control circuit 8d is a PID control device expressed by $C_p(s)$ represented by a following expression.

$$C_p(s) = -\frac{K(s^2 + K_p s + K_i)}{s} \quad (15)$$

where K denotes a position differential gain, $K_p$ denotes a position proportional gain, and $K_i$ is a position integral gain.

When a transfer characteristic of a torque control circuit 5 is made ideally 1, and an open-loop transfer function at the time when a loop is opened at the input end of the control object 1 is $L_p(s)$, $L_p(s)$ is the sum of a transfer function of a loop starting from the input end of the control object 1, passing through the electric motor 3, the position detection circuit 6 and the position control circuit 8d, and returning to the input end of the control object 1, and a transfer function of a loop starting from the input end of the control object 1, passing through the load machine 2, the acceleration detection circuit 7, the vibration suppression circuit 11d and the position control circuit 8d, and returning to the input end of the control object 1, and is represented by a following expression.

$$L_p(s) = C_p(s)G_p(s) + \frac{\alpha}{s}C_p(s)G_a(s) \quad (16)$$
$$= -\frac{K(s^2 + K_p s + K_i)(\omega_z^{-2}s^2 + \alpha s + 1)}{Js^3(\omega_p^{-2}s^2 + 1)}$$

$L_p(s)$ has a zero given by the position control circuit 8d and a complex zero changed by an integral gain α of the vibration suppression circuit 11d. Since the complex zero changed by the integral gain α is the same as the complex zero z indicated by the expression (7), when α is increased positively independently of the adjustment of K, $K_p$ and $K_i$, the damping coefficient can be increased.

Besides, although there is a case where a zero given by the position control circuit 8d becomes a complex zero according to values of a position proportional gain $K_p$ and a position integral gain $K_i$, since the damping coefficient of the complex zero can be increased by adjusting the position proportional gain $K_p$ and the position integral gain $K_i$, even if the position differential gain K is increased, the close-loop pole converging on the complex zero does not vibrate the load machine 2. Thus, similarly to the embodiment 1, the improvement of the disturbance suppression force and the vibration suppression of the load machine 2 can be simultaneously realized by the simple adjustment.

Besides, by a way of thinking similar to the embodiment 1, also in the structure of FIG. 5, the vibration suppression circuit 11c can be constructed similarly to the structure of FIG. 6. In FIG. 5, in the case where the position control circuit 8c has the transfer characteristic of PI control of the gain $k_p$, and the velocity control circuit 9c has the transfer characteristic of the PI control, the vibration suppression circuit 11c has only to be constructed so as to have the transfer characteristic of the PI control as indicated by a following expression in which the proportion gain is $\alpha/k_p$ and the integral gain is $k_p$.

$$\frac{(\alpha/k_p)(s + k_p)}{s} \quad (17)$$

Incidentally, even when the position control circuit 9c has another transfer characteristic, such as IP control, not the PI control, the vibration suppression circuit 11c can be constructed similarly.

In the embodiment 2, although the vibration suppression circuit 11c is constructed to generate the position correction signal $x_c$ obtained by multiplying the acceleration signal $a_l$ of the load machine 2 by a proportional characteristic of the specified gain and integrate characteristic, the structure may be made such that a signal obtained by removing a specified frequency component from the acceleration signal $a_l$ of the load machine 2 is proportionally multiplied.

For example, by adding a low-pass filter to remove a component of a specified frequency or higher to the vibration suppression circuit 11c or the vibration suppression circuit 11d, it is possible to remove a high frequency noise which is included in the acceleration signal $a_l$ of the load machine 2 and has a possibility of exerting a bad influence on the stability of the mechanical system 4. The response frequency of the low-pass filter has only to be approximately five or more times larger than the antiresonant frequency $\omega_z$ of the mechanical system 4.

Besides, the integration of the vibration suppression circuit 11c or the vibration suppression circuit 11d may be made pseudo-integration having characteristics of integration and high-pass filter. When the high-pass filter is made to have a second-order or higher-order characteristic, a steady-state error due to an offset included in the acceleration signal of the load machine 2 can be removed. The order of the high-pass filter may be determined according to the sum of orders of integral elements included in the transfer characteristic from the acceleration signal $a_l$ to the torque command signal $\tau_r$. Incidentally, the cut-off frequency of the high-pass filter has only to be lower than approximately ¼ of the antiresonant frequency $\omega_z$ of the mechanical system 4.

Since the embodiment 2 is constructed as described above, by increasing the integral gain α of the vibration suppression circuit 11c or the vibration suppression circuit 11d, the position of the complex zero of $L_p(s)$ is made a position different from the position of the complex zero of $G_p(s)$ on the imaginary axis, and the damping coefficient can be increased. Thus, similarly to the embodiment 1, the improvement of the disturbance suppression force and the vibration suppression of the load machine 2 can be simultaneously realized by the simple adjustment.

Besides, as in the structure of FIG. 6, when there is no feedback input of the velocity signal $v_m$ to the velocity control circuit, the same effect can be obtained by the simpler structure in which the position correction signal $x_c$ obtained by proportionally and integrally multiplying the acceleration signal $a_l$ of the load machine 2 is added to the position signal $x_m$ of the electric motor 3.

EMBODIMENT 3

Figure 7:
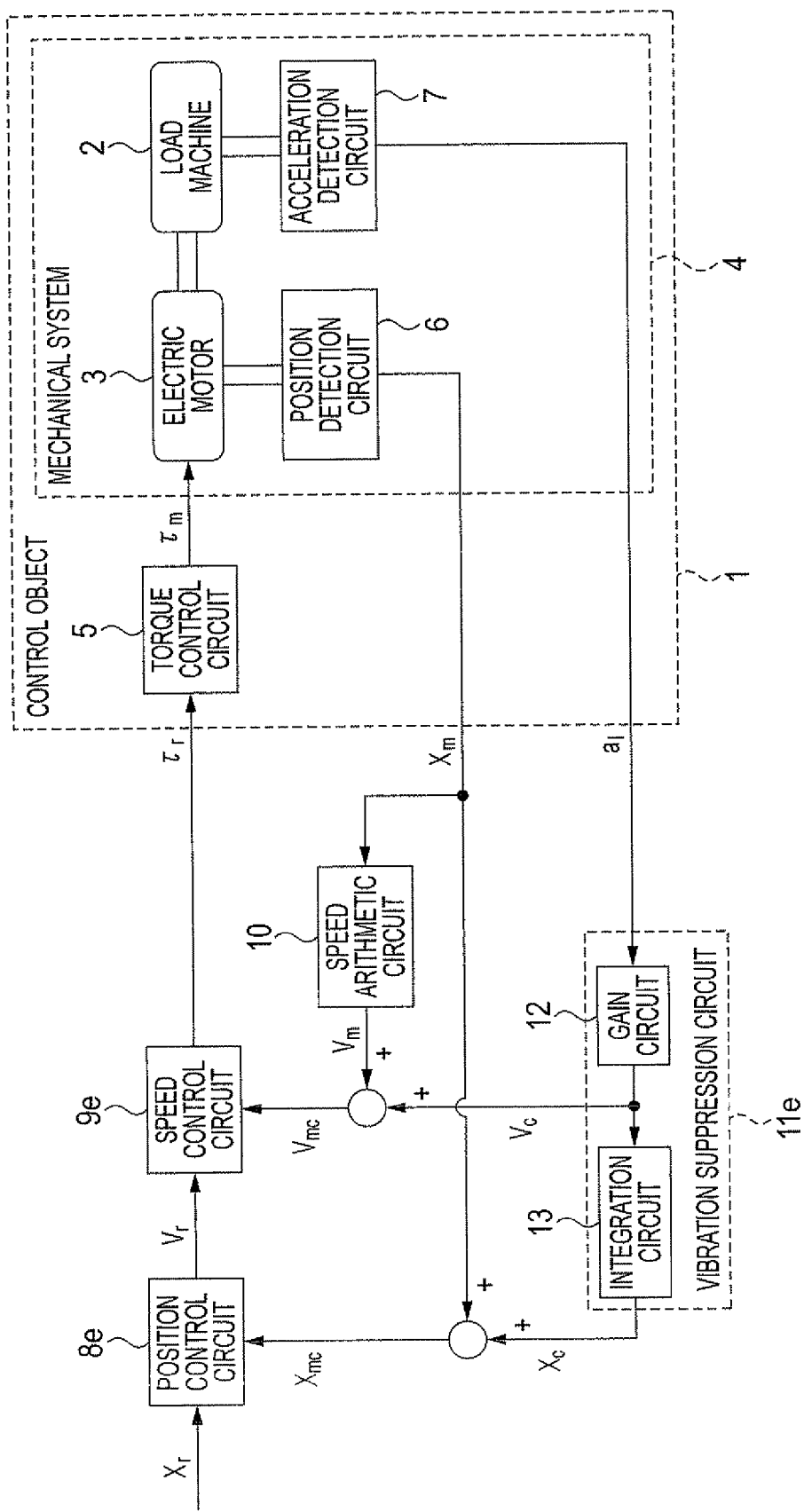
FIG. 7 is a block diagram showing an example of an electric motor control apparatus according to embodiment 3 of the invention.

FIG. 7 is a block diagram showing an electric motor control apparatus of embodiment 3 of the invention. A control object 1 is the same as that of the embodiment 1.

A position control circuit 8e inputs a position command signal $x_r$ and a corrected position signal $x_{mc}$ obtained by adding a position signal $x_m$ of an electric motor 3 and a position correction signal $x_c$ to correct the position signal $x_m$, and outputs a velocity command signal $v_r$.

A velocity control circuit 9e inputs the velocity command signal $v_r$ outputted by the position control circuit 8e and a corrected velocity signal $v_{mc}$ obtained by adding a velocity signal $v_m$ outputted by a velocity calculate circuit 10 performing an calculate operation on the position signal $x_m$ and a velocity correction signal $v_c$ to correct the velocity signal $v_m$, and outputs a torque command signal $\tau_r$.

Although a vibration suppression circuit 11e outputs the position correction signal $x_c$ and the velocity correction signal $v_c$, and the vibration suppression circuit 11e includes a gain circuit 12 to generate the velocity correction signal $v_c$ by proportionally multiplying an acceleration signal $a_l$ of a load machine 2, and an integration circuit 13 to generate the position correction signal $x_c$ by integrating the velocity correction signal $v_c$.

Next, the principle of the embodiment 3 will be described. It is assumed that the mechanical system 4 is a two-inertia system similarly to the embodiment 1. Besides, the gain of the gain circuit 12 in the inside of the vibration suppression circuit 11e is made α, and it is assumed that the transfer characteristic from the position signal $x_m$ of the electric motor 3 to the velocity command signal $v_r$ in the position control circuit 8e is indicated by a transfer characteristic of proportional control represented by a following expression.

$$C_p(s) = -k_p \quad (18)$$

where $k_p$ denotes a position proportional gain. Besides, it is assumed that the velocity control circuit 9e performs PI operation, represented by a following expression, of a deviation between the velocity command signal $v_r$ and the velocity signal $v_m$ of the electric motor 3.

$$C_v(s) = \frac{k_v(s + \omega_{vi})}{s} \quad (19)$$

where $k_v$ denotes a velocity proportional gain, and $\omega_{vi}$ denotes a velocity product gain.

In the case where the transfer characteristic of the torque control circuit 5 is made ideally 1, when an open-loop transfer function at the time when a loop is opened at the input end of the control object 1 is $L_p(s)$, $L_p(s)$ is the sum of a transfer function of a loop starting from the input end of the control object 1, passing through the position detection circuit 6, the position control circuit 8e, and the velocity control circuit 9e and returning to the input end of the control object 1, a transfer function of a loop starting from the input end of the control object 1, passing through the position detection circuit 6, the velocity calculate circuit 10 and the velocity control circuit 9e and returning to the input end of the control object 1, a transfer function of a loop starting from the input end of the control object 1, passing through the acceleration detection circuit 7, the gain circuit 12, the integration circuit 13, the position control circuit 8e and the velocity control circuit 9e and returning to the input end of the control object 1, and a transfer function of a loop starting from the input end of the control object 1, passing through the acceleration detection circuit 7, the gain circuit 12 and the velocity control circuit 9e and returning to the input end of the control object 1, and is represented by a following expression.

$$L_p(s) = -\frac{k_v(s + k_p)(s + \omega_{vi})(\omega_z^{-2}s^2 + \alpha s + 1)}{Js^3(\omega_p^{-2}s^2 + 1)} \quad (20)$$

$L_p(s)$ has real zeros $-k_p$ and $-\omega_{vi}$, and a complex zero changed by the integral gain α of the vibration suppression circuit 11e.

Since the damping coefficients of the two real zeros are always 1, when the velocity proportional gain $k_v$ is increased, the close-loop pole converging on the real zero does not vibrate the load machine.

Besides, the complex zero changed by the integral gain α is the same as the complex zero z indicated by the expression (7), and by positively increasing the integral gain α irrelevantly of the adjustment of the velocity proportional gain $k_v$, the velocity integral gain $v_i$ and the position proportional gain $k_p$, the position of the complex zero z of $L_p(s)$ is made a position different from the complex zero z' of $G_p(s)$ on the imaginary axis, and the damping coefficient can be increased.

Thus, similarly to the embodiment 1, the improvement of the disturbance suppression force and the vibration suppression of the load machine 2 can be simultaneously realized by the simple adjustment.

Incidentally, even when the velocity control circuit 9e has another transfer characteristic such as IP control, not the PI control, the vibration suppression circuit 11e can be constructed similarly.

Besides, in the embodiment 3, although the velocity calculate circuit 10 is constructed such that the velocity signal $v_m$ of the electric motor 3 is calculated from the position signal $x_m$ detected by the position detection circuit 6, the detection value of velocity of the electric motor 3 may be used.

Besides, although the vibration suppression circuit 11e is constructed such that the velocity correction signal $v_c$ is generated by proportionally multiplying the acceleration signal $a_l$ of the load machine 2, and the position correction signal $x_c$ is generated by integrating the velocity correction signal $v_c$, instead of the acceleration signal $a_l$, a signal obtained by removing a specified frequency component from the acceleration signal $a_l$ may be used.

For example, by adding a low-pass filter to remove a component of a specified frequency or higher to the vibration suppression circuit 11d, it is possible to remove a high frequency noise which is included in the acceleration signal $a_l$ and has a possibility of exerting a bad influence on the stability of the mechanical system 4. The response frequency of the low-pass filter has only to be five or more times higher than the antiresonant frequency $\omega_z$ of the mechanical system 4.

Besides, a high-pass filter to remove a component of a specified frequency or lower is added to the transfer characteristic from the acceleration signal $a_l$ of the load machine 2 to the velocity correction signal $v_c$ in the vibration suppression circuit 11e, and instead of the integration included in the transfer characteristic from the acceleration signal $a_l$ to the position correction signal $x_c$, pseudo-integration having characteristics of integration and high-pass filter of second-order or higher-order characteristic may be used. The order of the high-pass filter included in the pseudo-integration may be determined according to the sum of the orders of integral elements included in the transfer characteristic from the acceleration signal $a_l$ to the torque command signal $\tau_r$. The vibration suppression circuit 11e is made to have the above structure, so that a steady-state error due to an offset included in the acceleration signal $a_l$ can be removed.

The cut-off frequency of the high-pass filter added to the transfer characteristic from the acceleration signal $a_l$ to the velocity correction signal $v_c$ and that of the high-pass filter included in the pseudo-integration used instead of the integration included in the transfer characteristic from the acceleration signal $a_l$ to the position correction signal $x_c$ has only to be lower than ¼ of the antiresonant frequency $\omega_z$ of the mechanical system 4.

Since the embodiment 3 is constructed as described above, by increasing the gain α of the gain circuit 12 in the inside of the vibration suppression circuit 11e, the position of the complex zero of $L_p(s)$ is made a position different from the complex zero of $G_p(s)$ on the imaginary axis, and the damping coefficient can be increased. Thus, similarly to the embodiment 1, the improvement of the disturbance suppression force and the vibration suppression of the load machine 2 can be realized by the simple adjustment.

EMBODIMENT 4

Figure 8:
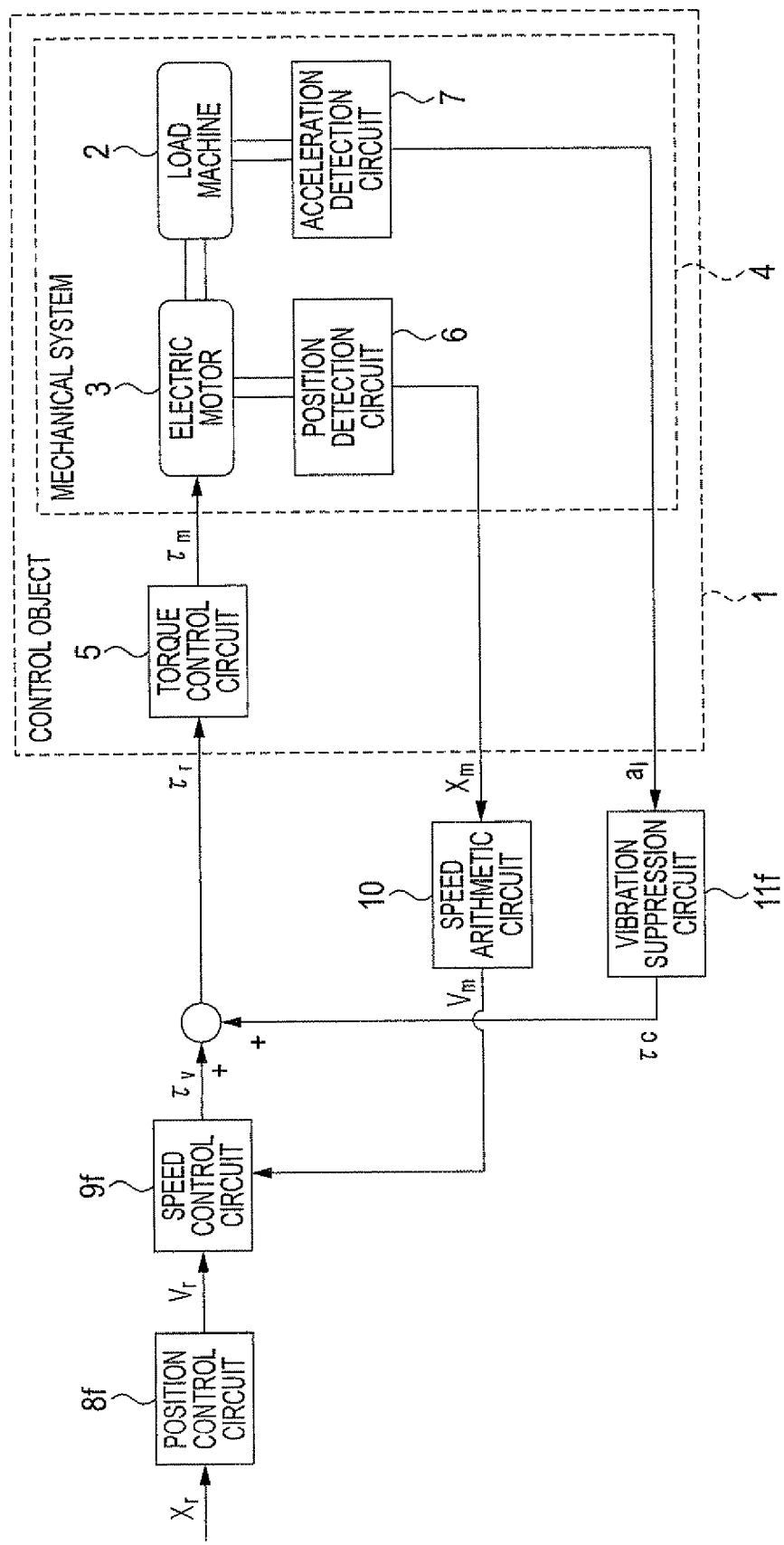
FIG. 8 is a block diagram showing an example of an electric motor control apparatus according to embodiment 4 of the invention.

FIG. 8 is a view showing an electric motor control apparatus of embodiment 4 of the invention.

A control object is the same as that of the embodiment 1.

On the other hand, in the embodiments 1 to 3, the vibration suppression circuits 11a to 11e input the acceleration signal $a_l$ of the load machine 2, and outputs the position correction signal $x_c$ to correct the position signal $x_m$ or the velocity correction signal $v_c$ to correct the velocity signal $v_m$, however, in the embodiment 4, a vibration suppression circuit 11f is constructed to input an acceleration signal $a_l$ and to output a torque correction signal $\tau_c$ to correct a torque command signal $\tau_v$ outputted by a velocity control circuit 9f.

A position control circuit 8f inputs a position command signal $x_r$, and outputs a velocity command signal $v_r$.

The velocity control circuit 9f inputs the velocity command signal $v_r$ outputted by the position control circuit 8f and a velocity signal $v_m$ outputted by a velocity calculate circuit 10 performing an calculate operation on a position signal $x_m$ of an electric motor 3, and outputs the torque command signal $\tau_v$.

The vibration suppression circuit 11f is constructed such that a transfer function from the acceleration signal $a_l$ to the torque command signal $\tau_v$ becomes one obtained by multiplying the whole transfer function from the velocity signal $v_m$ to the torque command signal $\tau_v$ by a gain. A corrected torque signal $\tau_r$ to be given to a torque control circuit 5 is obtained by adding the torque command signal $\tau_v$ outputted by the velocity control circuit 9f and the torque correction signal $\tau_c$ outputted by the vibration suppression circuit 11f.

The principle of the embodiment 4 will be described below. In FIG. 8, it is assumed that a mechanical system 4 is a two-inertia system, a transfer characteristic of the torque control circuit 5 is made ideally 1, a transfer function from the acceleration signal $a_l$ of a load machine 2 to the corrected torque signal $\tau_r$ is made $C_a(s)$, and a transfer characteristic from the velocity signal $v_m$ to the corrected torque signal $\tau_r$ in the velocity control circuit 9f is $C_v(s)$ represented by the expression (4), the vibration suppression circuit 11f has only to be constructed so that $C_a(s)$ becomes a transfer characteristic represented by a following expression.

$$C_a(s) = \alpha C_v(s) = -\frac{\alpha k_v(s + \omega_{vi})}{s} \tag{21}$$

where α denotes a gain multiplied to the whole transfer characteristic $C_v(s)$ from the velocity signal $v_m$ to the corrected torque signal $\tau_r$ in the vibration suppression circuit 11f.

At this time, an open-loop transfer function at the time when a loop is opened at the input end of the control object 1 becomes quite the same as the expression (6), and similarly to the embodiment 1, the improvement of the disturbance suppression force and the vibration suppression of the load machine 2 can be simultaneously realized by the simple adjustment.

Incidentally, similarly to the embodiment 1, even when the velocity control circuit 9f has another transfer characteristic, such as IP control, not the PI control, the vibration suppression circuit 11f can be similarly constructed.

Although the vibration suppression circuit 11f generates the velocity correction signal $v_c$ by performing the PI calculate operation on the acceleration signal $a_l$ of the load machine 2, a signal obtained by removing a specified frequency component from the acceleration signal $a_l$ may be used.

For example, by adding a low-pass filter to remove a component of a specified frequency or higher to the vibration suppression circuit 11f, it is possible to remove a high frequency noise which is included in the acceleration signal $a_l$ and has a possibility of exerting a bad influence on the stability of the mechanical system 4. The cut-off frequency of the low-pass filter has only to be five or more times higher than the antiresonant frequency $\omega_z$ of the mechanical system 4.

Besides, in the case where an integration characteristic is included in the vibration suppression circuit 11f, pseudo-integration having an integration characteristic and a high-pass filter characteristic may be used. By using the pseudo-integration, a steady-state error due to an offset included in the acceleration signal $a_l$ can be removed. The cut-off frequency of the high-pass filter has only to be lower than ¼ of the antiresonant frequency $\omega_z$ of the mechanical system 4.

As in the embodiment 4, since the vibration suppression circuit 11f is constructed such that the transfer function from the acceleration signal $a_l$ of the load machine 2 to the torque command signal $\tau_v$ becomes one obtained by multiplying the whole transfer function from the velocity signal $v_m$ to the torque command signal $\tau_v$ by a gain, similarly to the embodiment 1, the improvement of the disturbance suppression force and the vibration suppression of the load machine 2 can be simultaneously realized by the simple adjustment.

Besides, what is obtained by equivalent transformation of the electric motor control apparatus described in the embodiment 4 has the same effect as the above.

EMBODIMENT 5

Figure 9:
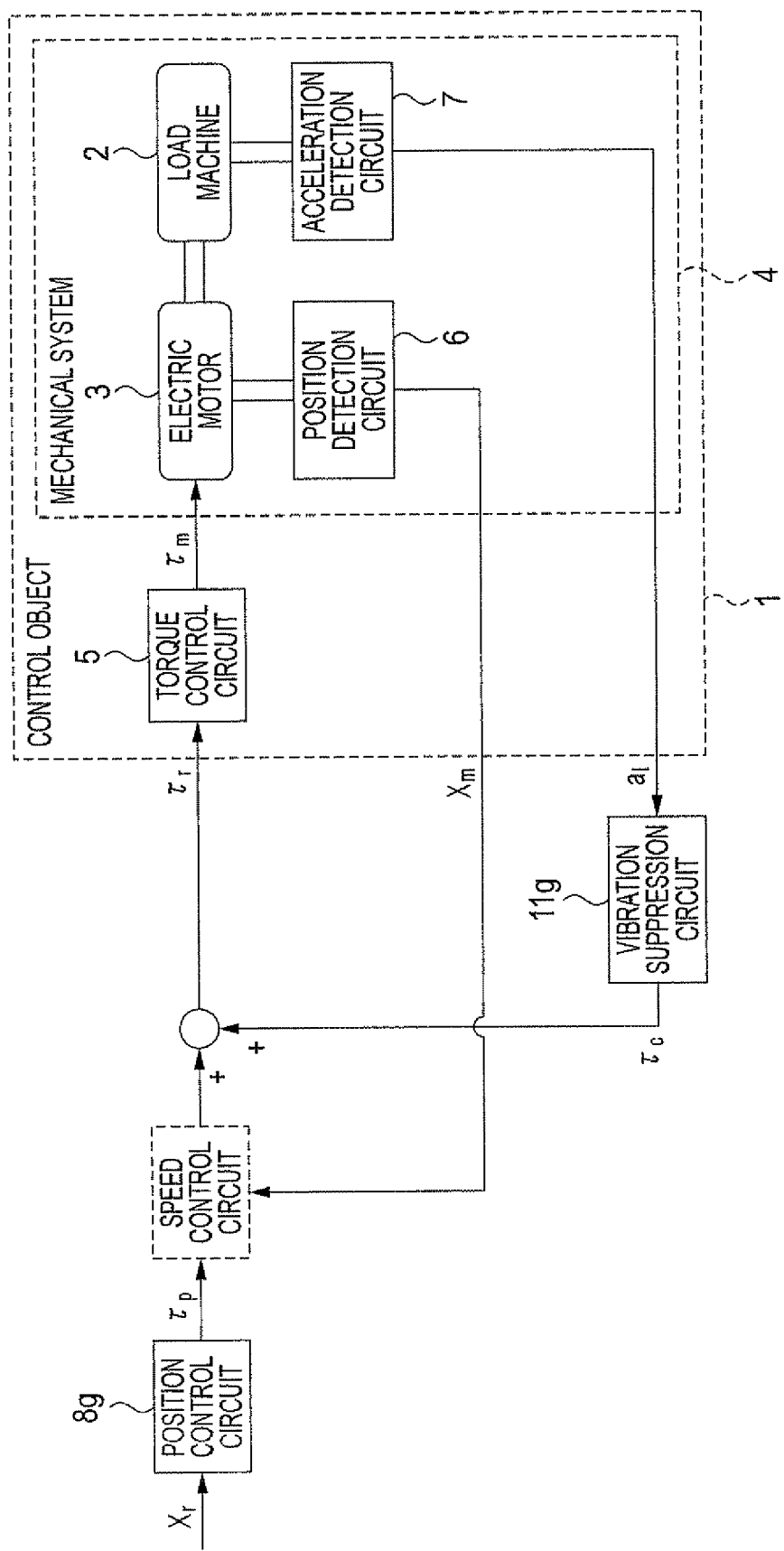
FIG. 9 is a block diagram showing an example of an electric motor control apparatus according to embodiment 5 of the invention.

FIG. 9 is a view showing an electric motor control apparatus of embodiment 5, which is another embodiment in which a torque correction signal $\tau_c$ is obtained based on an acceleration signal $a_l$ similarly to the embodiment 4.

A control object 1 is the same as that of the embodiment 1.

A position control circuit 8g inputs a position command signal $x_r$ to an electric motor 3 and a position signal $x_m$ of the electric motor 3, and outputs directly a torque command signal $\tau_p$ directly without interposing a velocity control circuit.

A vibration suppression circuit 11g is constructed such that a transfer function from an acceleration signal $a_l$ to a torque command signal $\tau_p$ becomes one obtained by multiplying the whole transfer function from the position signal $x_m$ to the torque command signal $\tau_p$ by a gain characteristic and an integration characteristic. A torque correction signal $\tau_c$ outputted by the vibration suppression circuit 11g is added to the torque command signal $\tau_p$ outputted by the position control circuit 8g, and a correction torque command signal $\tau_r$ to be given to a torque control circuit 5 is obtained.

Hereinafter, the operation principle will be described. Similarly to the embodiment 1, it is assumed that a mechanical system 4 of FIG. 9 is a two-inertia system, and a transfer characteristic of the torque control circuit 5 is made ideally 1. When a transfer function from the acceleration signal $a_l$ of the load machine 2 to the torque command signal $\tau_p$ is $C_a(s)$, and a transfer characteristic from the velocity signal $v_m$ of the electric motor 3 to the torque command signal $\tau_p$ in the position control circuit 8g is, for example, $C_p(s)$ represented by the expression (15), the vibration suppression circuit 11g is constructed so that $C_a(s)$ becomes a transfer function represented by a following expression.

$$C_a(s) = \frac{\alpha}{s} C_p(s) = \frac{\alpha K(s^2 + K_p s + K_i)}{s^2} \quad (22)$$

where $\alpha$ is a gain multiplied to the whole transfer characteristic $C_p(s)$ from the position signal $x_m$ of the electric motor 3 to the torque command signal $\tau_p$ in the vibration suppression circuit 11g. At this time, since the open-loop transfer function at the time when the loop is opened at the input end of the control object 1 becomes quite the same as the expression (16), similarly to the embodiment 1, the improvement of the disturbance suppression force and the vibration suppression of the load machine 2 can be simultaneously realized by the simple adjustment.

Although the vibration suppression circuit 11g has the structure in which the torque correction signal $\tau_c$ is generated by performing the PID operation on the acceleration signal $a_l$ of the load machine 2, a filter to remove a specified frequency component may be added to the vibration suppression circuit 11g.

For example, by adding a low-pass filter to remove a component of a specified frequency or higher to the vibration suppression circuit 11g, it is possible to remove a high frequency noise which is included in the acceleration signal $a_l$ and has a possibility of exerting a bad influence on the stability of the mechanical system 4. The cut-off frequency of the low-pass filter has only to be approximately five or more times higher than the antiresonant frequency $\omega_z$ of the mechanical system 4.

Besides, the integration in the vibration suppression circuit 11g may be made the pseudo-integration having characteristics of integration and high-pass filter. When the high-pass filter is made to have the second-order or higher-order characteristic, a steady-state error due to an offset included in the acceleration signal of the load machine 2 can be removed. The cut-off frequency of the high-pass filter has only to be lower than approximately ¼ of the antiresonant frequency $\omega_z$ of the mechanical system 4.

As in the embodiment 5, since the vibration suppression circuit 11g is constructed such that the transfer function from the acceleration signal $a_l$ of the load machine 2 to the torque command signal $\tau_p$ becomes the transfer function obtained by multiplying the whole transfer function from the position signal $x_m$ of the electric motor 3 to the torque command signal $\tau_p$ by the proportion integration characteristic, similarly to the embodiment 1, the improvement of the disturbance suppression force and the vibration suppression of the load machine 2 can be realized by the simple adjustment, and the optimum structure of the electric motor control apparatus suitable for the actual apparatus can be obtained.

Figure 10:
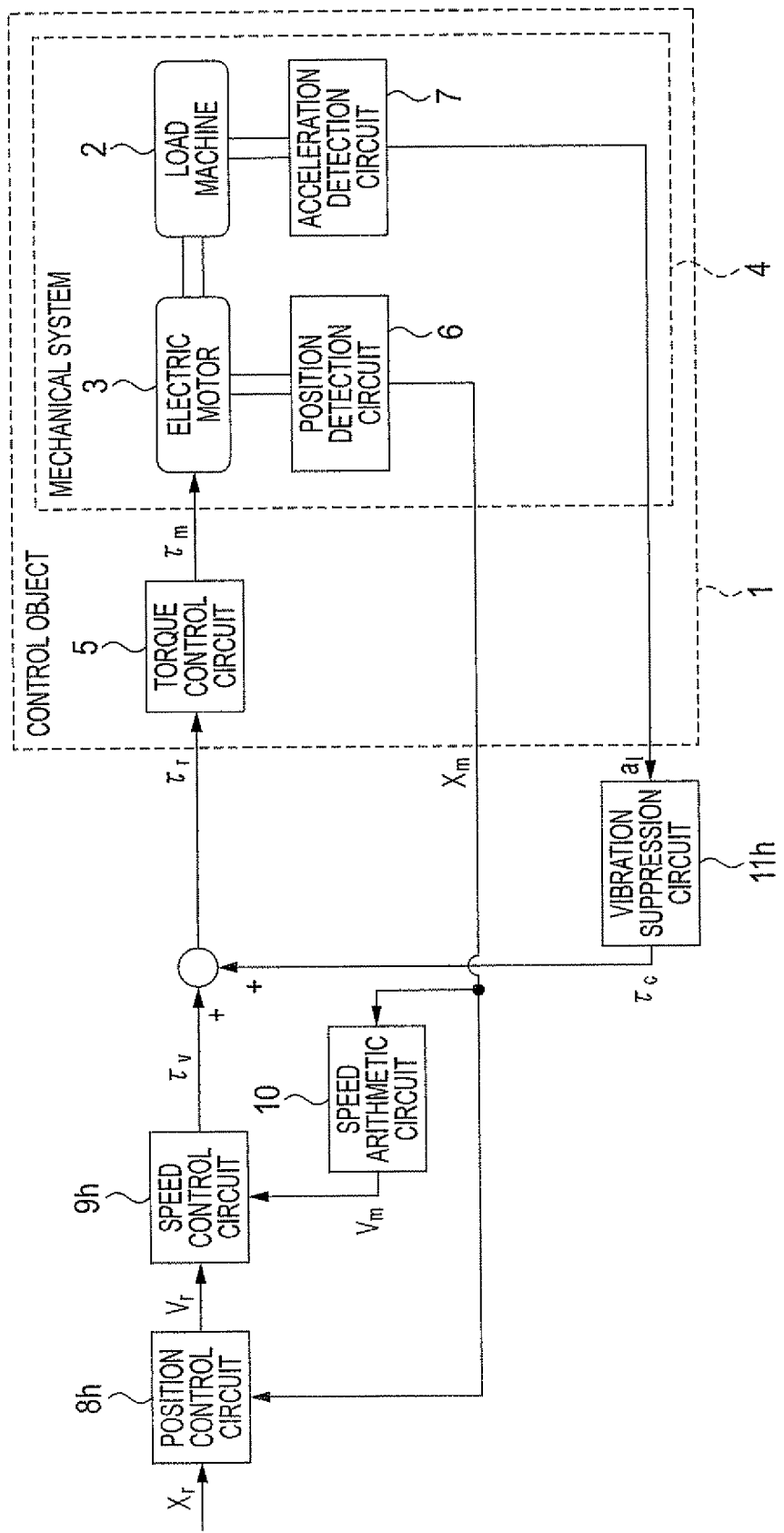
FIG. 10 is a block diagram showing an example of the electric motor control apparatus according to the embodiment 5 of the invention.

Besides, also in a structure of FIG. 10 having the feedback of the position signal $x_m$ and the velocity signal $v_m$ of the electric motor 3 included in the embodiment 4 and the embodiment 5, when a vibration suppression circuit 11h is constructed such that a transfer function from an acceleration signal $a_l$ of a load machine 2 to a torque command signal $\tau_v$ becomes a transfer function obtained by multiplying the whole transfer function from the position signal $X_m$ of the electric motor 3 to the torque command signal $\tau_v$ by a proportion integration characteristic, similarly to the embodiment 1, the improvement of the disturbance suppression force and the vibration suppression of the load machine 2 can be simultaneously realized by the simple adjustment.

Besides, what is obtained by equivalent transformation of the electric motor control apparatus described in the embodiment 5 can obtain the same effect as the above.

Besides, in the respective embodiments, although the description has been made on the structure in which the position signal $x_m$ indicating the present value of the position of the electric motor 3 is detected by the position detection circuit 6, and the velocity signal $v_m$ is outputted by the velocity calculate circuit 10 performing the calculate operation on the position signal $x_m$, however, even when the structure is such that the velocity signal $v_m$ indicating the present value of the velocity of the electric motor 3 is detected by a velocity detection circuit, and the position signal $x_m$ is calculated from the velocity signal $v_m$, the invention has the same effect.

The invention claimed is:

1. An electric motor control apparatus comprising:
   position control means that receives a position command signal specifying a target value of position of an electric motor driving a load machine and a position signal indicating position of the electric motor, and outputs a velocity command signal specifying target value of velocity of the electric motor;
   velocity control means that receives the velocity command signal and a correction velocity signal, obtained by adding a velocity signal, indicating the velocity of the electric motor, and a velocity correction signal, to correct the velocity signal, and outputs a torque command signal specifying target value of torque of the electric motor driving the load machine; and vibration suppression means that receives an acceleration signal to indicating acceleration of the load machine or acceleration of the load machine on which a low-pass filter and a high-pass filter are made to act, outputs the velocity correction signal, and sets a transfer function from the acceleration signal to the torque command signal to a transfer function obtained by multiplying a transfer function from the position signal to the torque command signal by a proportion characteristic and an integration characteristic.

2. The electric motor control apparatus according to claim 1, wherein the high-pass filter has an order equal to or greater than that of an integration element included in a transfer function from the acceleration of the load machine to the torque command signal to specify the target value of the torque of the electric motor driving the load machine.

3. An electric motor control apparatus comprising:
velocity control means that receives a velocity command signal specifying target value of velocity of an electric motor driving a load machine and a correction velocity signal, obtained by adding a velocity signal, indicating velocity of the electric motor, and a velocity correction signal, to correct the velocity signal, and outputs a torque command signal specifying target value of torque of the electric motor driving the load machine; and
vibration suppression means that outputs the velocity correction signal obtained by multiplying an acceleration signal of the load machine by a proportional characteristic to indicate an acceleration of the load machine or acceleration of the load machine on which a low-pass filter and a high-pass filter are made to act, and sets a transfer function from the acceleration signal to the torque command signal to a transfer function obtained by multiplying a transfer function from the velocity signal to the torque command signal by a proportion characteristic.

4. The electric motor control apparatus according to claim 3, wherein the high-pass filter has an order equal to or greater than that of an integration element included in a transfer function from the acceleration of the load machine to the torque command signal to specify the target value of the torque of the electric motor driving the load machine.

5. An electric motor control apparatus comprising:
position control means that receives a position command signal specifying target value of position of an electric motor driving a load machine and a correction position signal, obtained by adding a position signal, indicating position of the electric motor, and a position correction signal, to correct the position signal, and outputs a velocity command signal specifying target value of velocity of the electric motor;
velocity control means that receives the velocity command signal and a velocity signal indicating the velocity of the electric motor, and outputs a torque command signal specifying target value of torque of the electric motor driving the load machine; and
vibration suppression means that receives an acceleration signal indicating acceleration of the load machine or acceleration of the load machine on which a low-pass filter and a high-pass filter are made to act, outputs the position correction signal, and sets a transfer function from the acceleration signal to the torque command signal to a transfer function obtained by multiplying a transfer function from the position signal to the torque command signal by a proportion characteristic and an integration characteristic.

6. The electric motor control apparatus according to claim 5, wherein the high-pass filter has an order equal to or greater than that of an integration element included in a transfer function from the acceleration of the load machine to the torque command signal to specify the target value of the torque of the electric motor driving the load machine.

7. An electric motor control apparatus comprising:
position control means that receives a position command signal specifying target value of position of an electric motor driving a load machine and a correction position signal, obtained by adding a position signal, indicating position of the electric motor, and a position correction signal, to correct the position signal, and outputs a torque command signal specifying target value of torque of the electric motor driving the load machine; and
vibration suppression means that outputs the position correction signal obtained by multiplying the acceleration signal of the load machine by a proportional characteristic of the specified gain and integration characteristic to indicate acceleration of the load machine or acceleration of the load machine on which a low-pass filter and a high-pass filter are made to act, and sets a transfer function from the acceleration signal to the torque command signal to a transfer function obtained by multiplying a transfer function from the position signal to the torque command signal by a proportion characteristic and an integration characteristic.

8. The electric motor control apparatus according to claim 7, wherein the high-pass filter has an order equal to or greater than that of an integration element included in a transfer function from the acceleration of the load machine to the torque command signal to specify the target value of the torque of the electric motor driving the load machine.

9. An electric motor control apparatus comprising:
position control means that receives a position command signal specifying target value of position of an electric motor driving a load machine and a position correction signal, obtained by adding a position signal, indicating position of the electric motor and a correction position signal, to correct the position signal, and outputs a velocity command signal specifying target value of velocity of the electric motor;
velocity control means that receives the velocity command signal and a correction velocity signal, obtained by adding a velocity signal, indicating the velocity of the electric motor, and a velocity correction signal, to correct the velocity signal, and outputs a torque command signal specifying target value of torque of the electric motor driving the load machine; and
vibration suppression means that outputs the velocity correction signal obtained by proportionally multiplying an acceleration signal indicating acceleration of the load machine on which a low-pass filter and a high-pass filter are made to act, and the position correction signal obtained by integrating the velocity correction signal, and sets a transfer function from the acceleration signal to the torque command signal to a transfer function obtained by multiplying a transfer function from the position signal to the torque command signal by a proportion characteristic and an integration characteristic.

10. The electric motor control apparatus according to claim 9, wherein the high-pass filter has an order equal to or greater than that of an integration element included in a transfer function from the acceleration of the load machine to the torque command signal to specify the target value of the torque of the electric motor driving the load machine.

11. An electric motor control apparatus comprising:
velocity control means that receives a velocity command signal specifying target value of velocity of a load machine driven by an electric motor and a velocity signal indicating velocity of the electric motor, and outputs a torque command signal specifying target value of torque of the electric motor driving the load machine; and
vibration suppression means that receives an acceleration signal indicating acceleration of the load machine or acceleration of the load machine on which a low-pass filter and a high-pass filter are made to act, outputs a torque command correction signal to correct the torque command signal, and sets a transfer function from the acceleration signal to the torque command correction signal to a transfer function obtained by multiplying a transfer function from the velocity signal to the torque command signal by a proportion characteristic.

12. The electric motor control apparatus according to claim 11, wherein the high-pass filter has an order equal to or greater than that of an integration element included in a transfer function from the acceleration of the load machine to the torque command signal to specify the target value of the torque of the electric motor driving the load machine.

13. An electric motor control apparatus comprising:
position control means that receives a position command signal specifying target value of position of a load machine driven by an electric motor and a position signal indicating position of the electric motor, and outputs a torque command signal specifying target value of torque of the electric motor driving the load machine; and
vibration suppression means that receives an acceleration signal indicating acceleration of the load machine or acceleration of the load machine on which a low-pass filter and a high-pass filter are made to act, outputs a torque command correction signal to correct the torque command signal, and sets a transfer function from the acceleration signal to the torque command correction signal to a transfer function obtained by multiplying a transfer function from the position signal to the torque command signal by a proportion characteristic and an integration characteristic.

14. The electric motor control apparatus according to claim 13, wherein the high-pass filter has an order equal to or greater than that of an integration element included in a transfer function from the acceleration of the load machine to the torque command signal to specify the target value of the torque of the electric motor driving the load machine.

15. An electric motor control apparatus comprising:
position control means that receives a position command signal specifying target value of position of a load machine driven by an electric motor and a position signal indicating position of the electric motor, and outputs a velocity command signal specifying target value of a velocity of the electric motor;
velocity control means that receives the velocity command signal and a velocity signal indicating the velocity of the electric motor, and outputs a torque command signal specifying target value of a torque of the electric motor driving the load machine; and
vibration suppression means that receives an acceleration signal indicating acceleration of the load machine or acceleration of the load machine on which a low-pass filter and a high-pass filter are made to act, outputs a torque command correction signal to correct the torque command signal, and sets a transfer function from the acceleration signal to the torque command correction signal to a transfer function obtained by multiplying a transfer function from the position signal to the torque command signal by a proportion characteristic and an integration characteristic.

16. The electric motor control apparatus according to claim 15, wherein the high-pass filter has an order equal to or greater than that of an integration element included in a transfer function from the acceleration of the load machine to the torque command signal to specify the target value of the torque of the electric motor driving the load machine.

* * * * *